United States Patent
Liang et al.

(10) Patent No.: US 8,340,209 B2
(45) Date of Patent: Dec. 25, 2012

(54) METHOD AND APPARATUS FOR PROVIDING HIGH EFFICIENCY CARTESIAN MODULATION

(75) Inventors: Paul Cheng-Po Liang, Santa Clara, CA (US); Koji Takinami, Osaka (JP); Hua Wang, San Mateo, CA (US); Toru Matsuura, Osaka (JP)

(73) Assignee: Panasonic Corporation, Osaka (JP)

( * ) Notice: Subject to any disclaimer, the term of this patent is extended or adjusted under 35 U.S.C. 154(b) by 782 days.

(21) Appl. No.: 12/554,863

(22) Filed: Sep. 4, 2009

(65) Prior Publication Data
US 2011/0058622 A1   Mar. 10, 2011

(51) Int. Cl.
*H04L 25/34* (2006.01)
*H04L 25/49* (2006.01)
(52) U.S. Cl. ........ 375/286; 375/261; 375/295; 375/297; 375/298

(58) Field of Classification Search .............. 375/261, 375/286, 295, 297, 298
See application file for complete search history.

(56) References Cited

U.S. PATENT DOCUMENTS

| | | | | |
|---|---|---|---|---|
| 5,351,016 | A * | 9/1994 | Dent | 332/103 |
| 7,426,377 | B2 * | 9/2008 | Tanaka et al. | 455/255 |
| 2003/0206600 | A1 * | 11/2003 | Vankka | 375/261 |
| 2004/0190660 | A1 * | 9/2004 | Morris et al. | 375/350 |

* cited by examiner

Primary Examiner — Ted Wang

(57) ABSTRACT

The disclosure relates to a method and apparatus for providing efficient signal transmission. Conventional linear amplifiers are most efficient when operated in compressed mode. In the compressed mode, the digital power amplifier switches between the on and off modes. A digital power amplifier operates in compressed mode only if the incoming signal is an on-off constant envelop signal. In one embodiment, the disclosure provides a method and apparatus for converting a digital baseband signal to on-off constant envelop signals for processing through binary-weighted or thermometer-weighted amplifier which are operated in compressed mode.

24 Claims, 21 Drawing Sheets

| Signal Mapping | | |
|---|---|---|
| Output Level | S1 | S2 |
| +2 | 1 | 1 |
| +1 | 1 | 0 |
| +0 | 0 | 0 |
| -1 | -1 | 0 |
| -2 | -1 | -1 |

| Output Level | S1 | S2 | S3 |
|---|---|---|---|
| +3 | 1 | 1 | 1 |
| +2 | 1 | 1 | 0 |
| +1 | 1 | 0 | 0 |
| +0 | 0 | 0 | 0 |
| -1 | -1 | 0 | 0 |
| -2 | -1 | -1 | 0 |
| -3 | -1 | -1 | -1 |

Signal Mapping

| Signal Mapping | | | | |
|---|---|---|---|---|
| Output Level | S1 | | S2 | |
| | b0 | b1 | | |
| +3 | 1 | 1 | 1 | |
| +2 | 1 | 1 | 0 | |
| +1 | 1 | 0 | 0 | |
| +0 | 0 | 0 | 0 | |
| -1 | -1 | 0 | 0 | |
| -2 | -1 | -1 | 0 | |
| -3 | -1 | -1 | -1 | |

METHOD AND APPARATUS FOR PROVIDING HIGH EFFICIENCY CARTESIAN MODULATION

BACKGROUND OF THE INVENTION

1. Field of the Invention

The disclosure is directed to method and apparatus for providing efficient signal transmission. More specifically, the disclosure relates to a method and apparatus for operating the digital power amplifier in compressed mode without dynamic supply modulation.

2. Description of Related Art

Wireless systems continuously strive to achieve higher data rates in order to support demand for high speed mobile internet applications. As data rates and signal bandwidths increase, the transceiver components consume more power. A continuing challenge has been to design a high throughput transceiver system while maintaining low power consumption.

It is generally known in the radio art that circuits that support only on-off constant envelope signals are more energy efficient than circuitry that supports envelope-varying signals. Conversely, amplifiers which receive input signals with multiple signal levels operate inefficiently. Thus, there is a need for a method and apparatus which enables power amplifiers to operate with maximum power efficiency. Among other advantages, a more efficient power amplifier will extend the life of the system battery.

SUMMARY OF THE INVENTION

The disclosure is directed to method and apparatus for providing efficient signal transmission. Conventional linear amplifiers are most efficient when operated in compressed mode. In the compressed mode, the digital power amplifier switches between the on and off modes. In other words, the amplifier remains off when it is not amplifying a signal. A digital power amplifier operates in compressed mode only if the incoming signal is a constant envelop signal. To this end, the disclosure provides methods and apparatus for converting a digital baseband signal to on-off constant envelop signals. The on-off constant envelop signals are then processed through binary weighted amplifiers or thermometer weighted amplifiers which are operated in compressed mode. The amplified signals are then combined to form an amplified output signal. As will be shown below, the disclosed invention requires significantly less power than conventional transmission methods. The disclosed invention also significantly reduces amplifier noise.

In one embodiment the disclosure relates to a method for providing high efficiency digital power amplification. The method comprises the steps of: (1) generating an I component signal and a Q component signal from a digital baseband signal, the I component signal and the Q component signal defining multilevel digital signals; (2) mapping the I component signal to a plurality of sub-I components and mapping the Q component signal to a plurality of sub-Q components to provide a plurality of sub-I component signals and a plurality of sub-Q component signals, each of the sub-I component signals and the sub-Q component signals defining an on-off constant envelop signal; (3) for each of the sub-I component signal, identifying a corresponding sub-Q component signal; (4) combining each of the sub-I component signals with a corresponding sub-Q component signal to form a plurality of I and Q subcomponent pairs; (5) amplifying each I and Q subcomponent pairs at a binary-weighted power amplifier operated in a compressed mode to form a plurality of amplified I and Q subcomponent pairs; combining the amplified I and Q subcomponent pairs to form an output signal.

In another embodiment, the disclosure relates to a method for reducing quantization noise during modulation of a digital baseband signal. An exemplary method includes the steps of: (1) generating an I component signal and a Q component signal from an incoming baseband signal; (2) determining signal levels for each of the I and Q component signals; (3) defining a first quantization set and a second quantization set, the first quantization set having a plurality of first quantization points and the second quantization set having a plurality of second quantization points; (4) dynamically mapping each of the signal levels to one of a first or the second quantization sets as a function of the signal level's proximity to one of the first or the second quantization points; (5) receiving the signal levels mapped to the first quantization set at a first mapper and forming a plurality of first on-off constant envelop signals therefrom; and (6) offsetting a phase of the signal levels mapped to the second quantization set and directing to a second mapper to form a plurality of second on-off constant envelop signals therefrom.

In still another embodiment, the disclosure relates to a signal transmitter for efficient amplification and transmission of a baseband signal. The transmitter includes a generator for generating I component signal and a Q component signal from a digital baseband signal; a converter circuit for determining a plurality of signal levels for each of the I and Q component signals, the converter circuit dynamically mapping each of the plurality of signal levels to one of a first or the second quantization sets as a function of each signal level's proximity to a quantization point associated with each quantization set, the converter circuit providing a first pair of multilevel I and Q component signals and a second set of multilevel I and Q component signals; a phase shifter for shifting a phase of the second set of multilevel I and Q component signals relative to the first pair of multilevel I and Q component signals; a digital line mapper for mapping the first multilevel I component signal to a plurality of sub-I component signals and mapping the multilevel Q component signal to a plurality of sub-Q component signal, each of the sub-I component signals and the sub-Q component signals defining an on-off constant envelop signal; a plurality of combiner for combining each of the sub-I component signals with a corresponding sub-Q component signal to form a plurality of I and Q subcomponent pairs; a plurality of binary-weighted amplifiers or thermometer weighted amplifiers for amplifying each I and Q subcomponent pairs to form a plurality of amplified I and Q subcomponent pairs; and an adder circuitry for adding the amplified I and Q subcomponent pairs to form an output signal; wherein each of the plurality of binary-weighted amplifiers operates in a compressed mode.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein.

DETAILED DESCRIPTION OF THE INVENTION

Engineering a high efficiency transmitter has been a goal of wireless equipment manufacturers. High efficiency transmitters can result in longer talk time and longer battery life. According to one implementation of the invention, transmitter efficiency can be improved by conducting signal amplification through a plurality of amplifiers operating in the compressed mode. Compressed mode operation of a digital amplifier requires turning the amplifier on only when the peak signal is being transmitted through the amplifier. At all other times, the amplifier is turned off.

Figure 1:
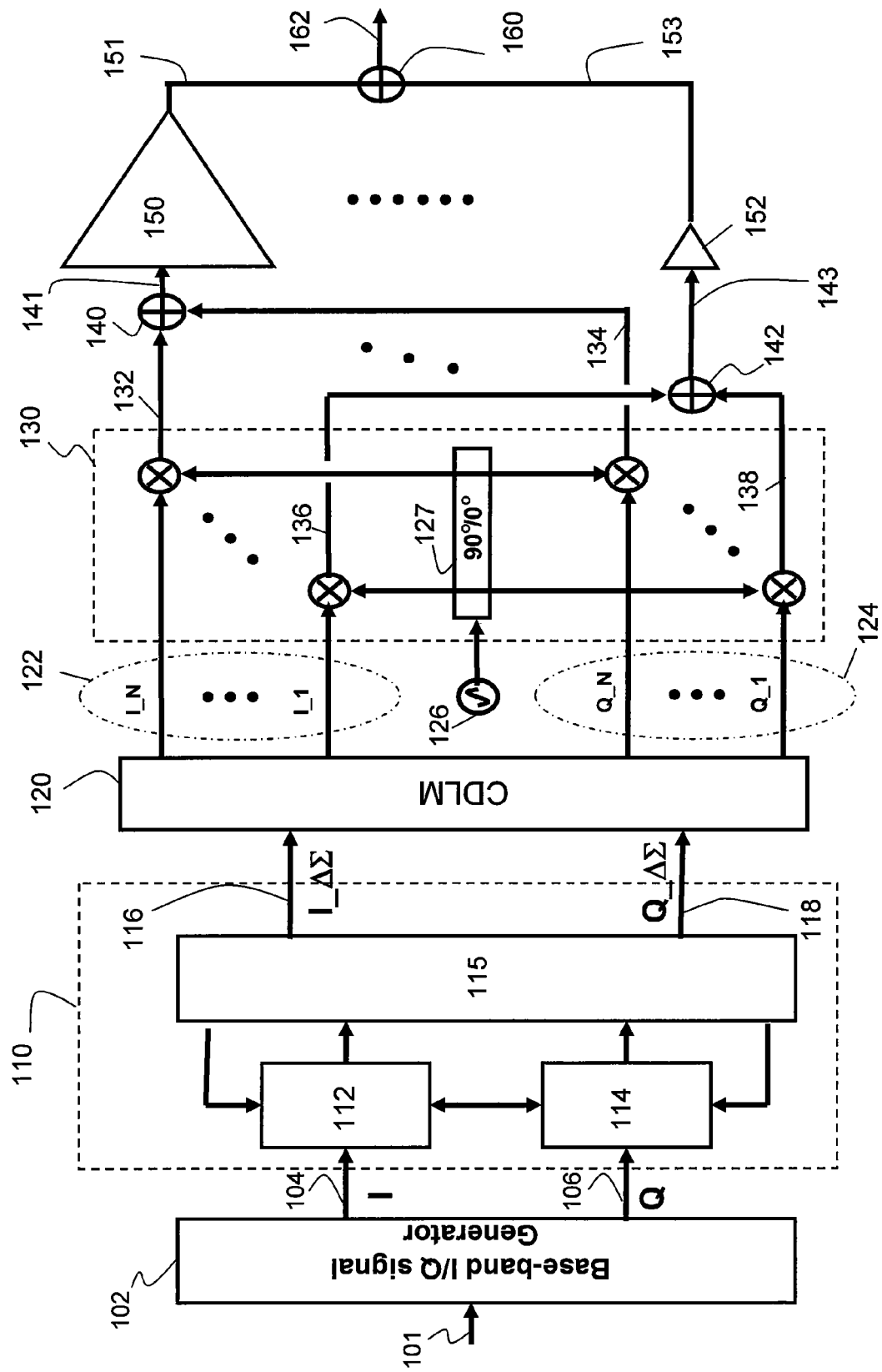
FIG. 1 is a system level block diagram of an exemplary transmitter architecture according to one embodiment of the invention.

FIG. 1 is a system level block diagram of an exemplary transmitter architecture according to one embodiment of the invention. In FIG. 1, baseband signal 101 contains digital data to be transmitted. Baseband I/Q signal generator 102 generates an I component signal 104 and a Q component signal 106. The I component signal 104 and the Q component signal 106 are then directed to $\Delta\Sigma$ Converter 110. $\Delta\Sigma$ Converter 110 includes noise shapers 112, 114 and quantizer 115. Noise shapers 112 and 114 define conventional noise shapers and provide their respective outputs to quantizer 115. Quantizer 115 maps the incoming signals into a first set of I and Q signals and a second set of I and Q signals. The mapping operation of quantizer 115 will be discussed in greater detail below. For simplicity, only the first set of I and Q signals are shown in FIG. 1.

Output signals 116 ($I\_\Delta\Sigma$) and 118 ($Q\_\Delta\Sigma$) are multilevel signals. As stated, digital power amplifiers operate most efficiently under a compressed mode. To this end, the input signal to the amplifier must be an on-off constant envelop signal. In accordance with an embodiment of the invention, Cartesian Digital Line Mapper ("CDLM") 120 converts multilevel IQ signals 116 and 118 to a plurality of tri-level signals. The tri-level signals are shown as sub-I component signals 122 and sub-Q signal components 124.

Mixer 130 modulates a sub-I component with its corresponding sub-Q component. Before the sub component signals are modulated, however, phase shifter 127 and oscillator 126 shift the phase of one of the subcomponent signals with respect to the other such that the I- and Q-sub component signals have orthogonal phases. While FIG. 1 shows four mixers, it should be noted that additional mixers can be added without departing from the principles of the invention.

Mixer 130 provides output signals 132, 134, 136 and 138. Adder 140 adds the I subcomponent 132 with its corresponding Q subcomponent 134 to form the I and Q subcomponent signal pair 141. Adder 142 adds I subcomponent 136 to its corresponding Q subcomponent 138 to form I and Q subcomponent signal pair 143. Signal pairs 141 and 143 are on-off constant envelop signals.

Paired signals 141 and 143 are then amplified by amplifiers 150 and 152, respectively. Amplifiers 150 and 152 are binary-weighted amplifiers and have different gains as pictorially illustrated by their different sizes. As will be discussed in greater detail, amplifiers 150 and 152 operate in compressed mode. Amplifier outputs 151 and 153 are added into output signal 162 by adder 160. Signal 162 can be transmitted through an antenna (not shown). The components and the operation of the system of FIG. 1 are discussed below in greater detail.

Figure 2:
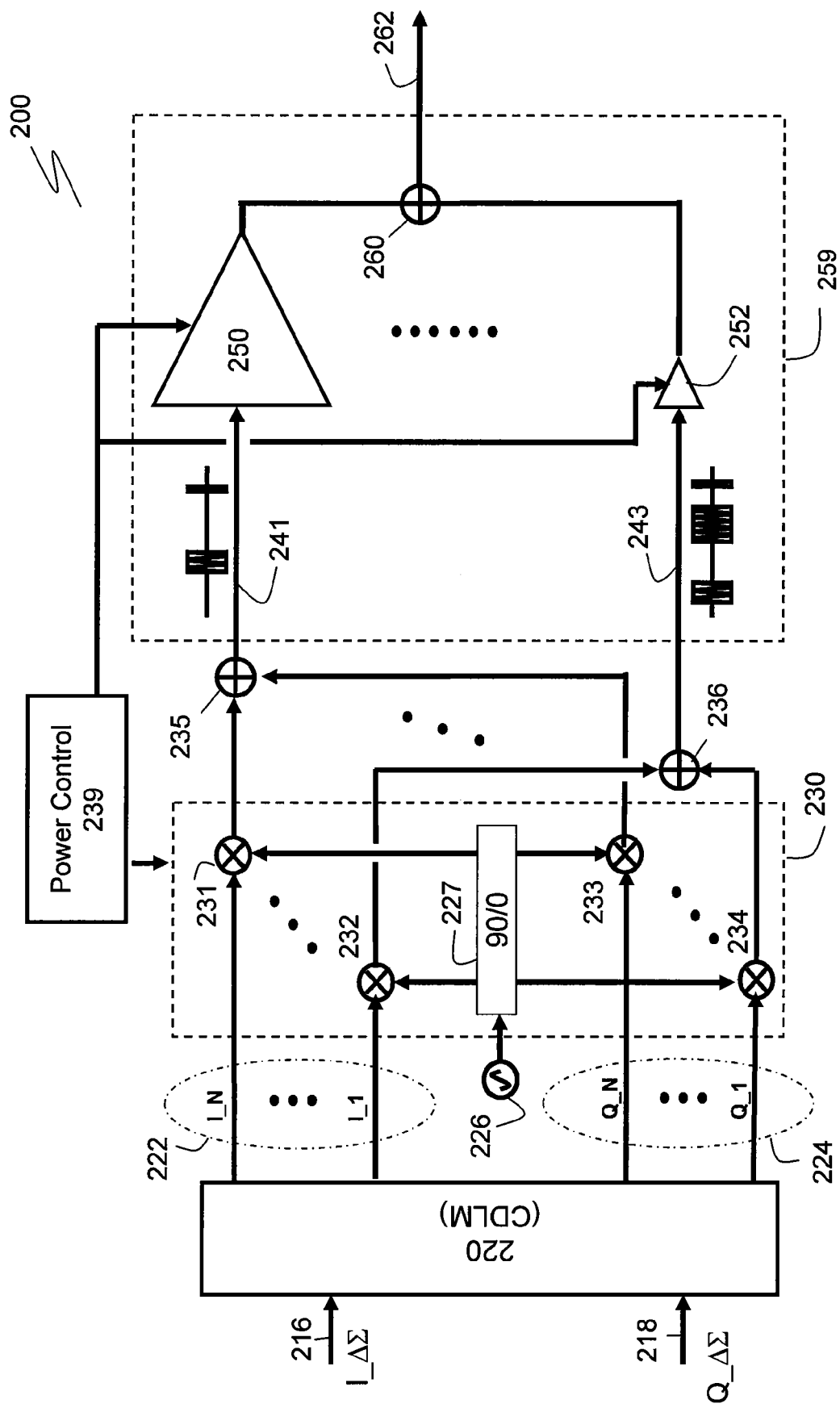
FIG. 2 is a schematic representation of a Cartesian digital line mapper according to one embodiment of the invention.

FIG. 2 is a schematic representation of a Cartesian digital line mapper according to one embodiment of the invention. Circuitry 200 of FIG. 2 receives input signals 216 and 218 which are, respectively, the I and Q components of an incoming baseband signal. As discussed, input signals 216 and 218 define multilevel signals. Cartesian mapper 220 maps the in-phase signal 216 and quadrature signal 218 to a plurality of I and Q subcomponent signals. Cartesian mapper 220 can include one or more processors (not shown). In an alternative embodiment, the processors can communicate with a memory circuit (not shown) containing a look-up table.

Cartesian mapper 220 outputs a plurality of parallel sub-I signal components and sub-Q signal components which are shown as groups 222 ($I_1$ through $I_n$) and 224 ($Q_1$ through $Q_n$). Each sub-I and sub-Q signal component is a tri-level signal. Cartesian mapper 220 maps the incoming multilevel signals to a plurality of tri-level signals using, among others, a binary weighted method or thermometer coding.

Next, the corresponding sub-I and sub-Q component signals are identified and phase shifted by oscillator 226 and phase shifter 227 such that the sub-I component signal and its corresponding sub-Q component signal have 90 degree phase difference.

Adders 235, 236 combine the sub-I component signal I_N with its corresponding sub-Q component signal Q_N to form I and Q subcomponent pair 241. Similarly, I and Q subcomponent pair 243 is formed by combining sub-I component signal I_1 and sub-Q component signal Q_1. The subcomponent pair signals are on-off constant envelop signals with corresponding phase information.

I and Q subcomponent pair 241 is processed through binary-weighted amplifier 250 and subcomponent pair 243 is processed through amplifier 252. Amplifiers 250 and 252 operate in compressed mode. That is, each amplifier is on when the incoming signal has an envelop not equal to zero. The amplifier is turned off when the incoming signal has no envelop value. Amplifiers 250 and 252 are powered by power control circuit 239. As will be discussed, amplifiers 250 and 252 have different gains. The power amplifiers can be either thermometer weighted or binary weighted. The amplifiers, as well as the components of combiner circuitry 230, are powered by power control circuit 239. Combiner circuitry comprises mixers 231, 232, 233 and 234. The amplifier outputs are added by adder 260 and output signal 262 is provided. Amplifier banks 259 show an amplification system according to one embodiment of the invention.

In FIG. 2, signals 216 and 218 are multilevel I and Q signals while the signals going into power amplifiers 250 and 252 are on-off constant envelops signals. Cartesian mapper 220 maps the M level I and Q signals into N power amplifiers. For binary weighted power amplifiers the following relationship holds:

$$M = 2^{(N+1)} - 1 \quad (1)$$

For thermometer weighted power amplifiers the following relationship holds:

$$M = 2N + 1 \quad (2)$$

Figure 3:
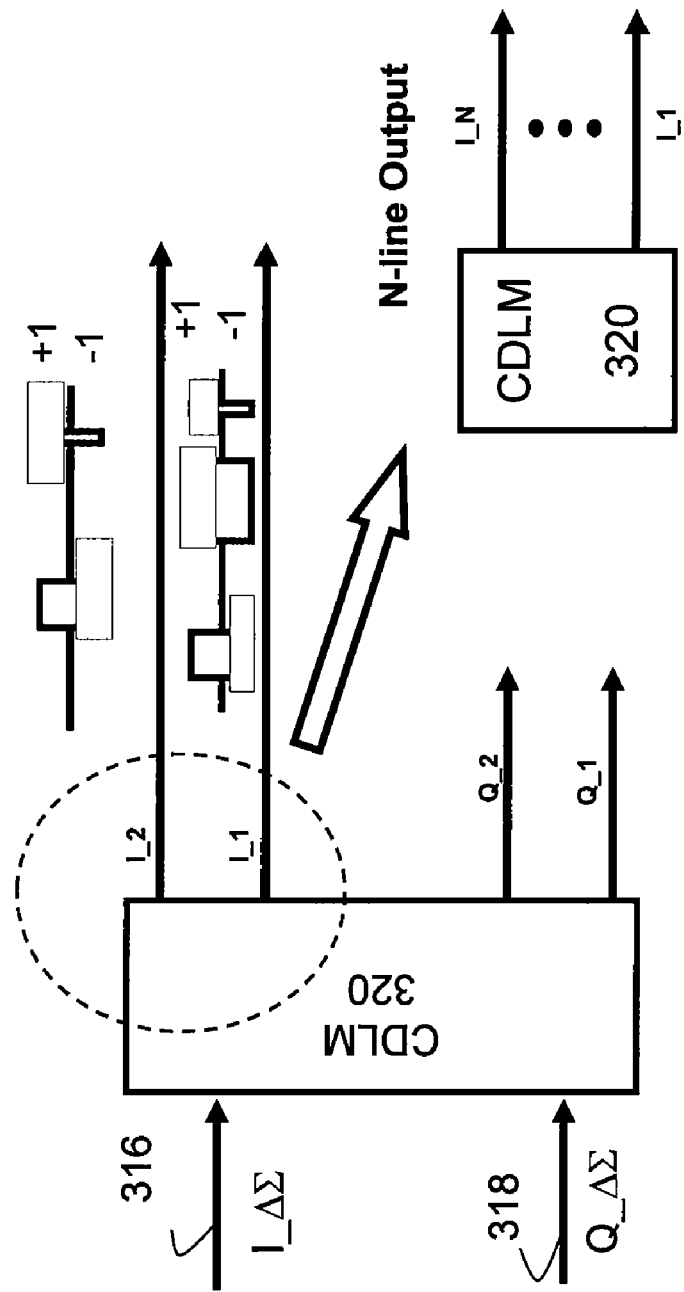
FIG. 3 is another representation of a Cartesian digital line mapper.

FIG. 3 shows a Cartesian mapper that receives signals in the form of an I component signal 316 (I_ΔΣ) and a Q component signal 318 (Q_ΔΣ). The I and the Q component signals are multilevel signals. Cartesian mapper 320 maps the I component signal to sub-I component signals $I_1$ and $I_2$. The Cartesian mapper also maps the Q component signal to sub-Q component signals $Q_1$ and $Q_2$. Cartesian mapper 320 can define an integrated line mapper or two dedicated line mappers. In addition, CDLM 320 can map an incoming multilevel signal into a plurality of tri-level signals as illustrated in FIG. 3.

Figure 4:
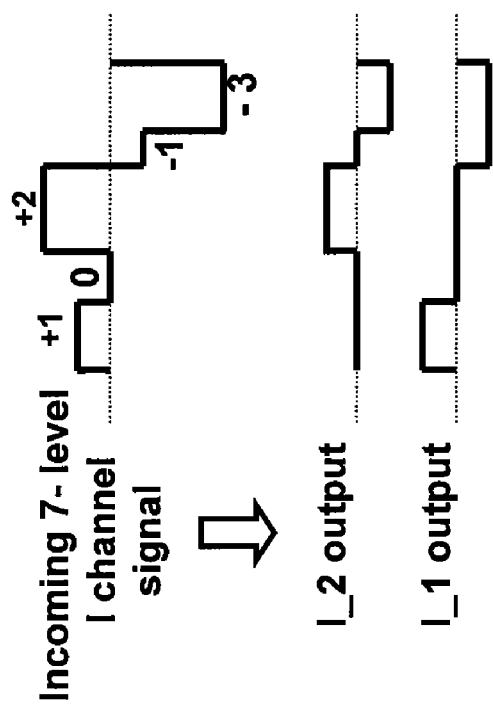
FIG. 4 shows a 7 level signal mapped into two on-off constant envelop signals according to a binary-weighted mapping table.

FIG. 4 shows a 7 level signal mapped into two tri-level signals according to a binary-weighted mapping table. Here, the multilevel signal is split into multiple parallel lines, and each line is either on (+1), on with an inverted phase (−1) or off (0). As a result, the multi-line output can be switched at very high speed with minimum linearity requirement.

Figure 5:
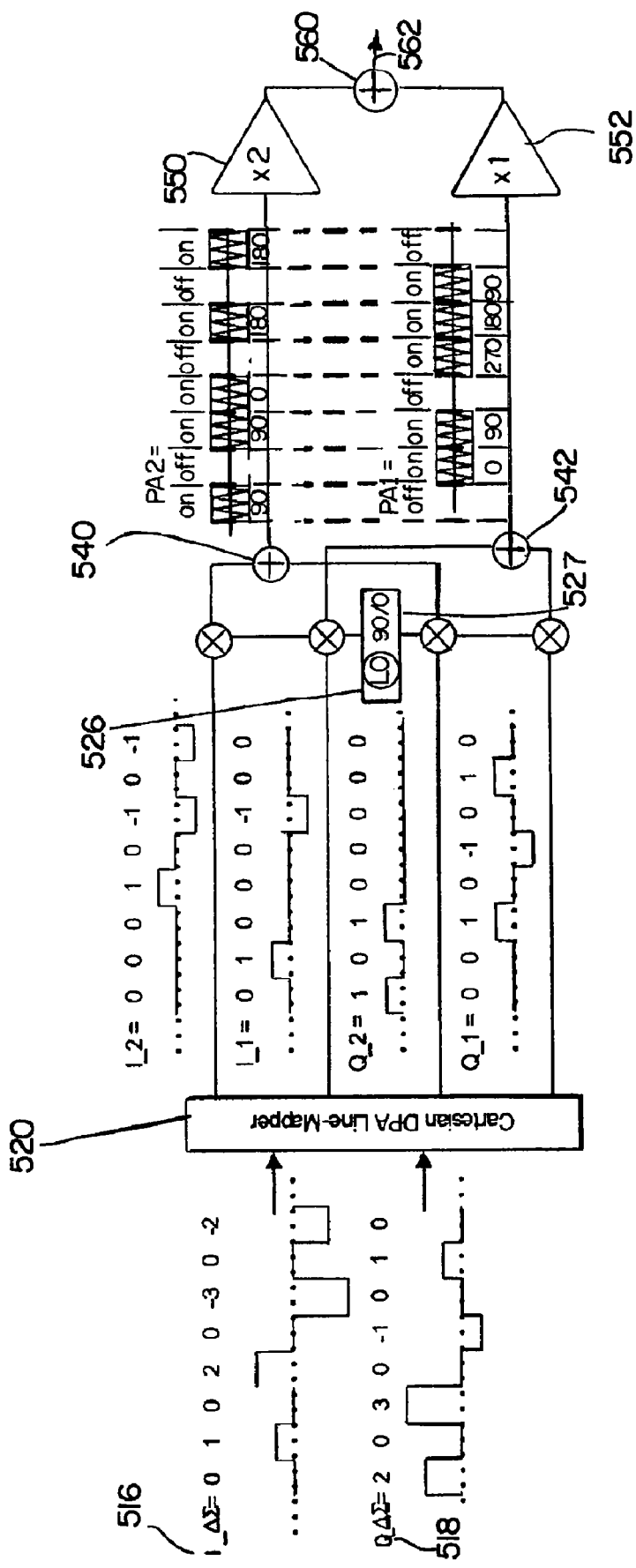
FIG. 5 shows an exemplary embodiment of the invention which uses two binary-weighted power amplifiers.

FIG. 5 shows an exemplary embodiment of the invention which uses two binary-weighted power amplifiers. In FIG. 5, I component signal 516 and Q component signal 518 are multilevel signals which are received by Cartesian mapper 520. The Cartesian mapper maps the I-signal component to sub-I signal components: I_1 and I_2. The Cartesian mapper also maps the Q component signal to sub-Q signal components: Q_1 and Q_2. Subcomponents I_1, I_2, Q_1 and Q_2 are tri-level signals.

Local oscillator 526 and phase shifter 527 allow phase orthogonality between the subcomponent signal pairs (i.e., I_1 and Q_1 and I_2 and Q_2) and provide signal envelop.

Adders 540 and 542 form I and Q subcomponent signal pairs as shown by signal PA1 and PA2. Signal pairs PA1 and PA2 are on-off constant envelop signals. Signal pairs PA1 and PA2 define on-off constant envelop signals, allowing amplifiers 550 and 552 to operate in compressed mode. Amplifier 550 provides a gain which is twice the gain of amplifier 552. The different gains enable amplitude variation and provide an output signal 562 identical to the incoming signal. For example, the first pulse in signal train PA2 and PA1 are 1 and 0, respectively. By multiplying 1 by a gain of 2 (PA2×2) and adding it to 0 (PA1×1), the combined output signal will have a first pulse of 2 which is identical to the first pulse of the Q-signal component 518.

Another embodiment of the invention relates to a method and apparatus for signal normalization. Referring to FIG. 1, signal normalization can be implemented at ΔΣ converter 110. Signal normalization occurs prior to Cartesian line mapping and significantly improves the transmitter performance.

Figure 6:
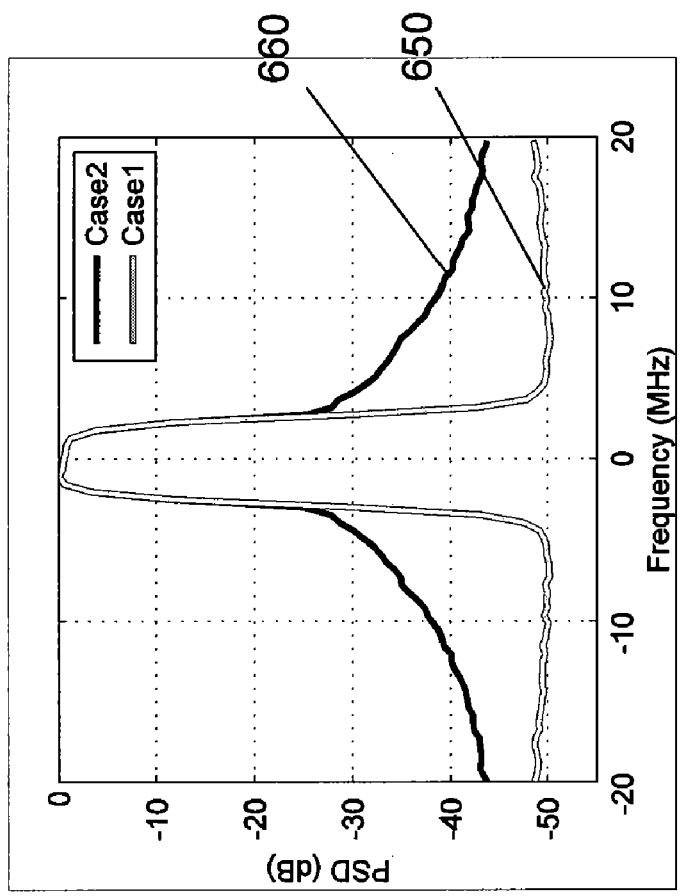
FIG. 6 shows instantaneous peak signal amplitude mapping with a conventional 4-point modulation scheme.
Figure 6:
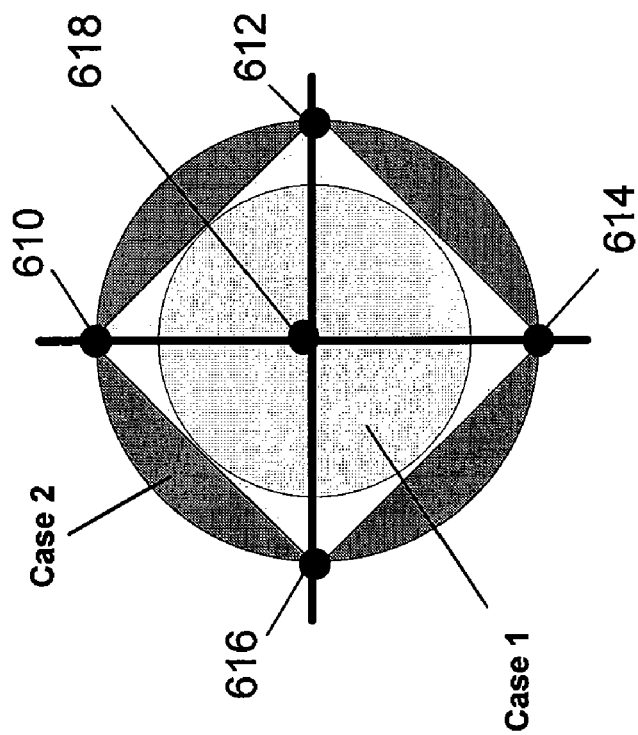

FIG. 6 shows instantaneous peak signal amplitude mapping when a conventional 5-point modulation scheme is used. The instantaneous peaks correspond to quantization points 610, 612, 614, 616 and 618. Quantization points 610, 612, 614, 616 and 618 define a quantization set. In a conventional power amplifier, the amplifier must switch very quickly between these 5 points. This means that any signal can be represented in the shaded area of Case 1, which is also known as the averaging area. However, if the signal appears in areas outside of the averaging area (i.e., in the shaded area of Case 2), the signal cannot be properly represented.

In Case 1 the power amplifier is not efficiently used, as only a fraction of the power amplifier's full power is applied to the averaging area. On the other hand, if the instantaneous peak signal amplitudes are mapped according to Case 2, the output power spectral density ("PSD") will be inefficient but the power amplifier reaches its full output power potential. The PSD degradation for Case 2 is due to the fact that the area of Case 2 cannot be effectively represented using the 5-point modulation scheme.

The power spectral density of the 5-point modulation is shown on the right hand side of FIG. 6. The PSD of Case 1 is represented by line 650 and the PSD of Case 2 is shown by line 660. The PSD of Case 2 shows significantly PSD degradation.

To maximize output power while reducing quantization noise, an embodiment of the invention is directed to dynamic mapping a ΔΣ converter output. Dynamic mapping allows finer levels of quantization and reduces the quantization noise.

Figure 7:
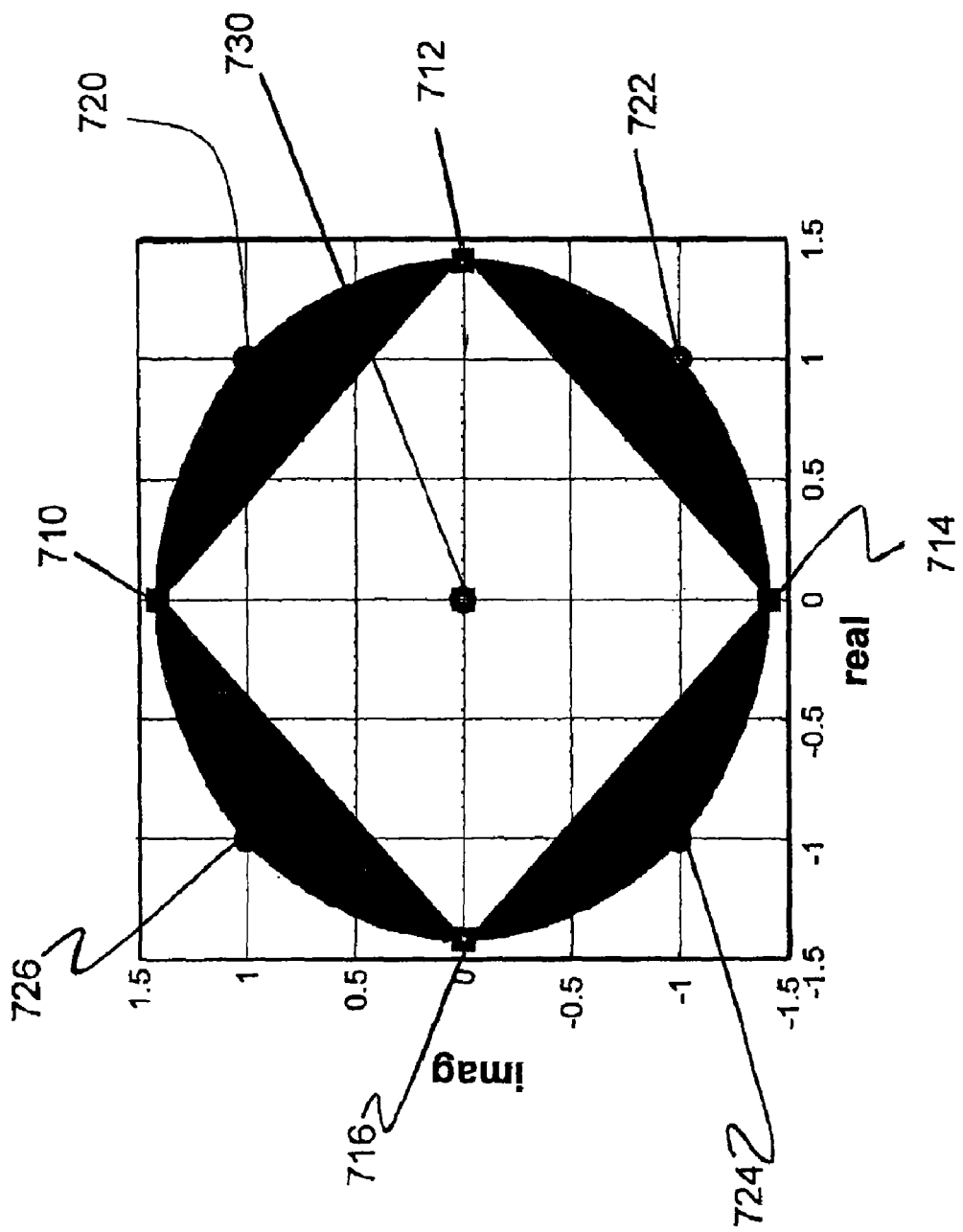
FIG. 7 is an illustration of dynamic $\Delta\Sigma$ mapping according to one embodiment of the disclosure.

FIG. 7 is an illustration of dynamic ΔΣ mapping according to one embodiment of the disclosure. A ΔΣ converter maps signals to quantization points 710, 712, 714, 716 and 730 which form the quantization set A. In addition to the quantization set A, a second quantization set (i.e., quantization set B) is established by defining a plurality of second quantization points which are rotated by +45° from quantization points of set A. The second quantization points are shown as 720, 722, 724, 726 and 730. Thus, an incoming component signal (e.g., signal 104 and 106 in FIG. 1) can be mapped to one of quantization sets A or B. This implementation reduces the quantization noise as the quantization points go from five to nine points. There is no limit to the number of quantization sets the algorithm can map to. The higher the number of quantization sets, the better the signal performance. However, the hardware complexity also increases as a result of increasing the number of quantization sets. A reasonable number of quantization points can range between 1 and 64.

Figure 8:
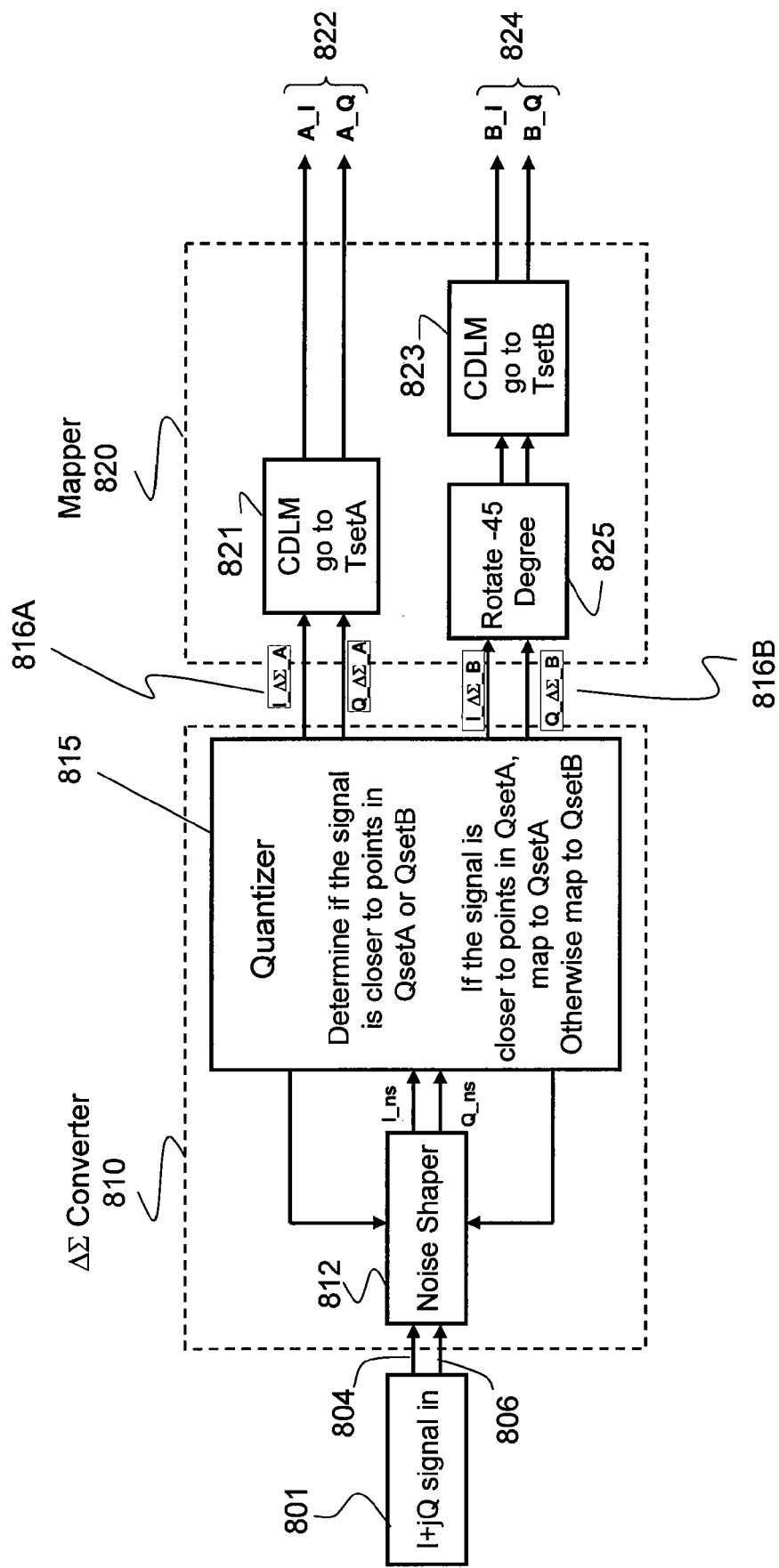
FIG. 8 schematically illustrates a method for dynamic $\Delta\Sigma$ mapping according to an embodiment of the invention.

FIG. 8 schematically illustrates a method for dynamic ΔΣ mapping according to an embodiment of the invention. Baseband signal 801 includes the real and the imaginary part of the signal is provided as shown. The baseband signal is separated to I component signal 804 (the real component) and Q component signal 806 (imaginary component). Similar to FIG. 1, noise shaper 812 processes the I and Q component signals and outputs an I component (I_ns) signal and Q component (Q_ns) signal. Quantizer 815 compares the incoming signal levels to predefined quantization points. If the signal levels are closer to quantization points in quantization set A, then the signal is mapped set A. Otherwise, the signal level is mapped to quantization set B. If it is determined that the signal should be mapped to quantization set B, then the signal phase is first shifted by −45° as shown in process block 825.

Regardless of whether a signal is mapped to quantization set A or B, it will have I and Q components. This is shown as the I and Q outputs of quantizer 815 which include I and Q components 816A (mapped to quantization set A) and 816B (mapped to quantization set B). When comparing the system diagram of FIG. 8 with FIG. 1, it should be noted that for brevity, FIG. 1 only shows the I and Q components of quantization set A (see signals 122 and 124).

Referring again to FIG. 8, mapper 820 may include CDLMs 821 and 823. The operation of an exemplary CDLM is described above. The output of CDLM 821 is directed to transmitter set A and the output of CDLM 823 is directed to transmitter set B.

Figure 9:
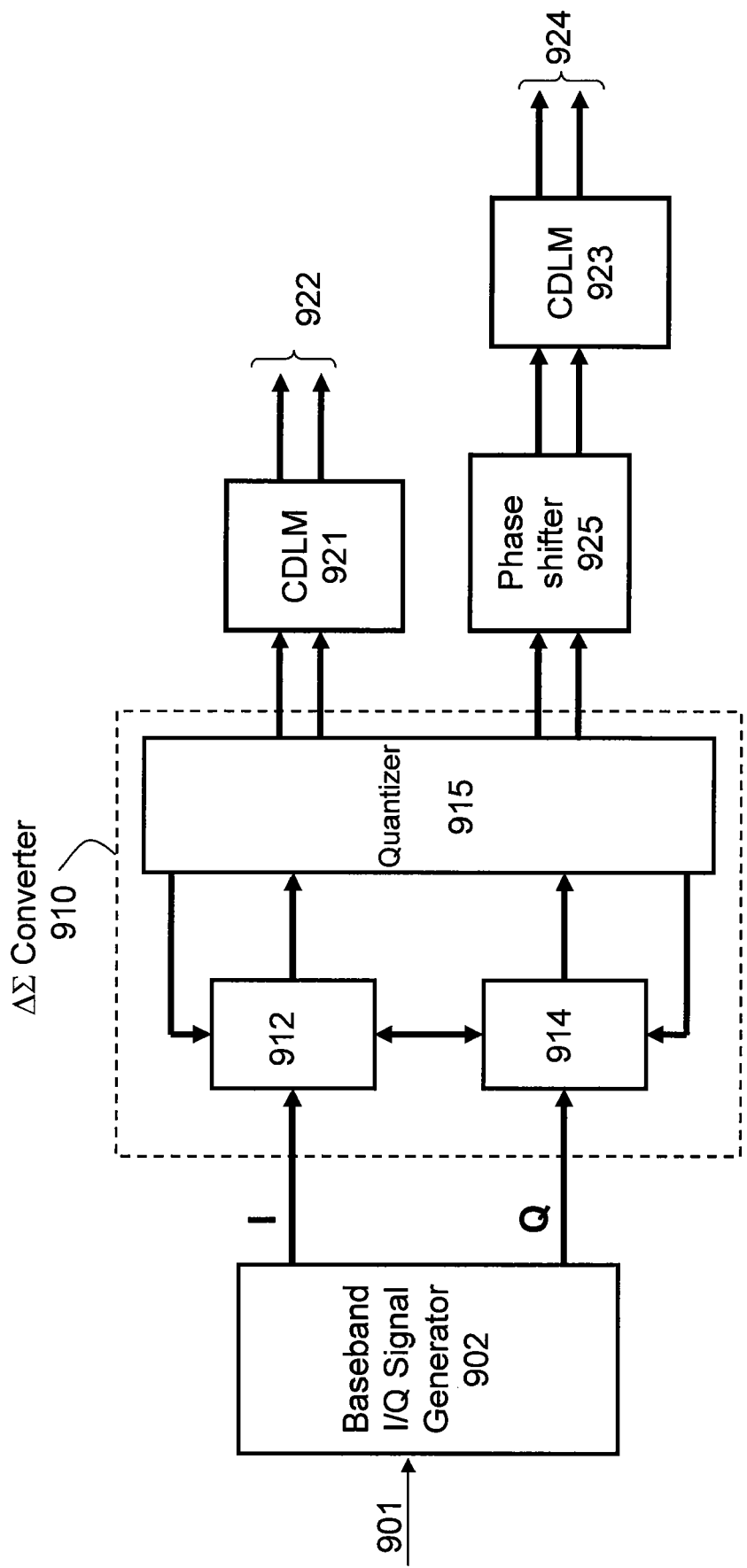
FIG. 9 is another exemplary embodiment of the invention in which noise shapers process the I and Q signal components independently of each other.

FIG. 9 is another exemplary embodiment of the invention in which noise shapers 912 and 914 process the I and Q signal components independently or jointly of each other. The remaining components of FIG. 9 are similar to those discussed in FIG. 8 and are similarly numbered.

Figure 10:
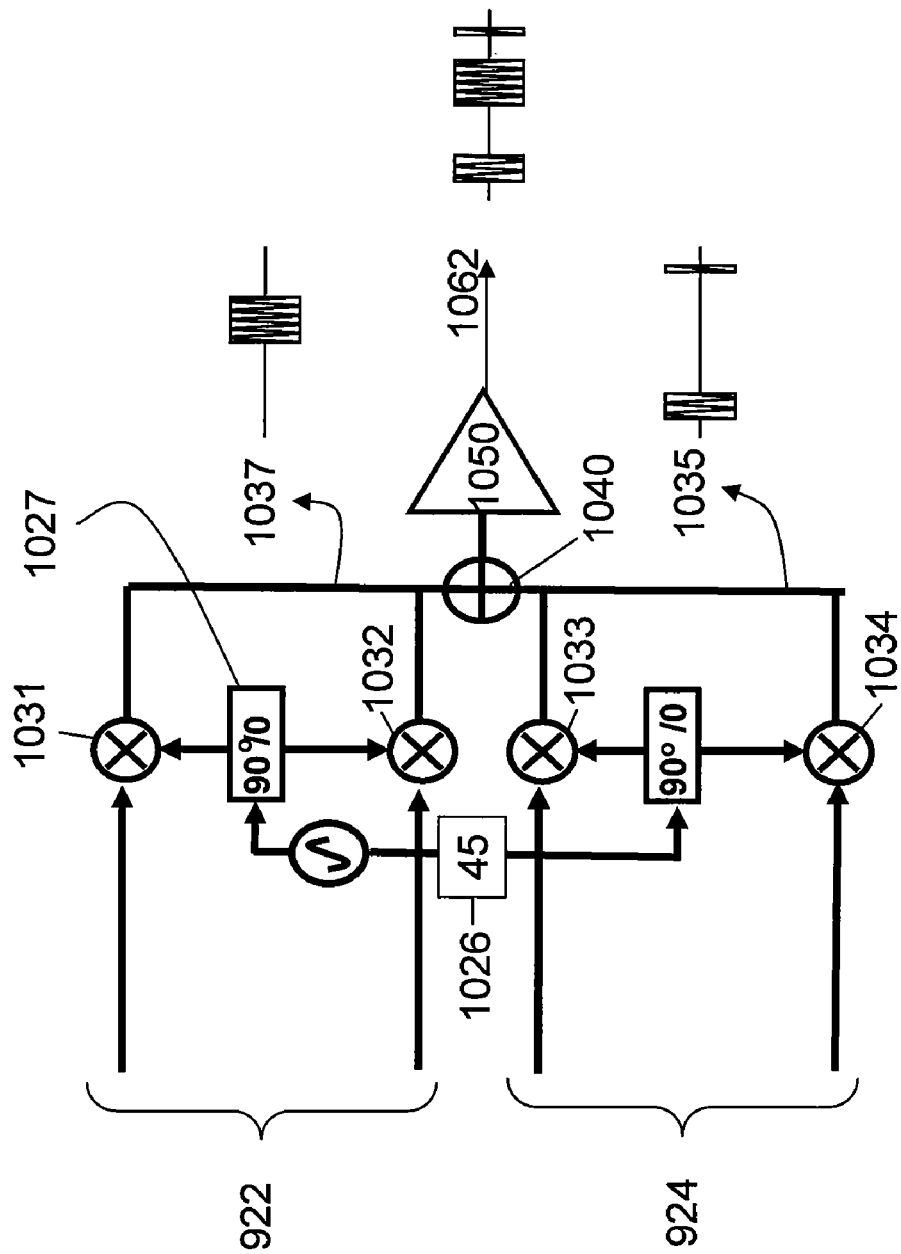
FIG. 10 shows the transmitter sets according to one embodiment of the invention.

FIG. 10 shows the transmitter sets according to one embodiment of the invention. Incoming signals 922 (corresponding to set A) and 924 (corresponding to set B) are the same signals identified in FIG. 9. Each of signals 922 and 924 includes an I and Q subcomponents and each defines a tri-level signal. Phase shifter 1026 rotates the phase of quantized set B by 45°. This counteracts the phase offset introduced by phase shifter 925 of FIG. 9. Thereafter, the subcomponent signals are modulated and combined to form paired signals 1035 and 1037. Adder 1040 adds paired signals 1035 and 1037 to form a combined signal. The combined signal is amplified by amplifier 1050.

Figure 11:
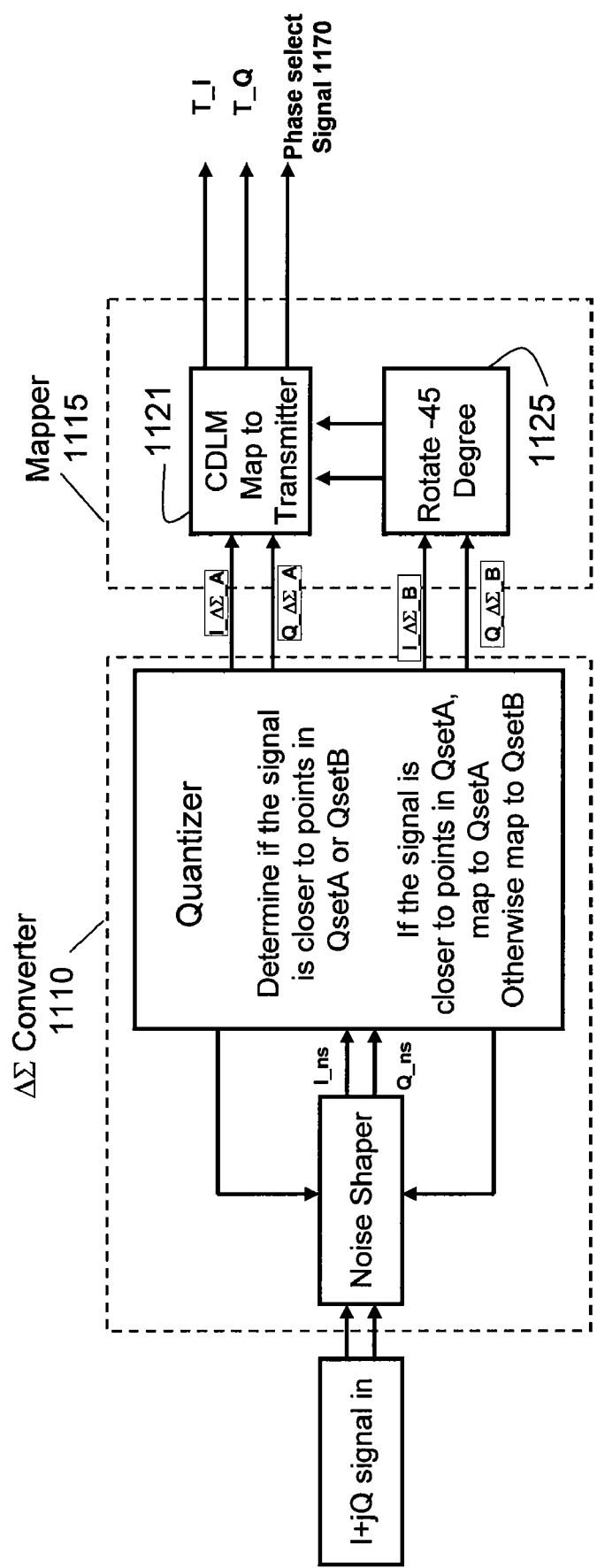
FIG. 11 shows an alternative implementation of the invention in which a single mapper is used.

FIG. 11 shows an alternative implementation of the invention in which a single mapper is used. The architecture of FIG. 11 differs from that of FIG. 8 in that a single Cartesian mapper (i.e., CDLM 1121) works with a phase selector to provide the same output as FIG. 8. Thus, the output of mapper 1115 includes tri-level signals T_I and T_Q as well as phase select signal 1170.

Figure 12:
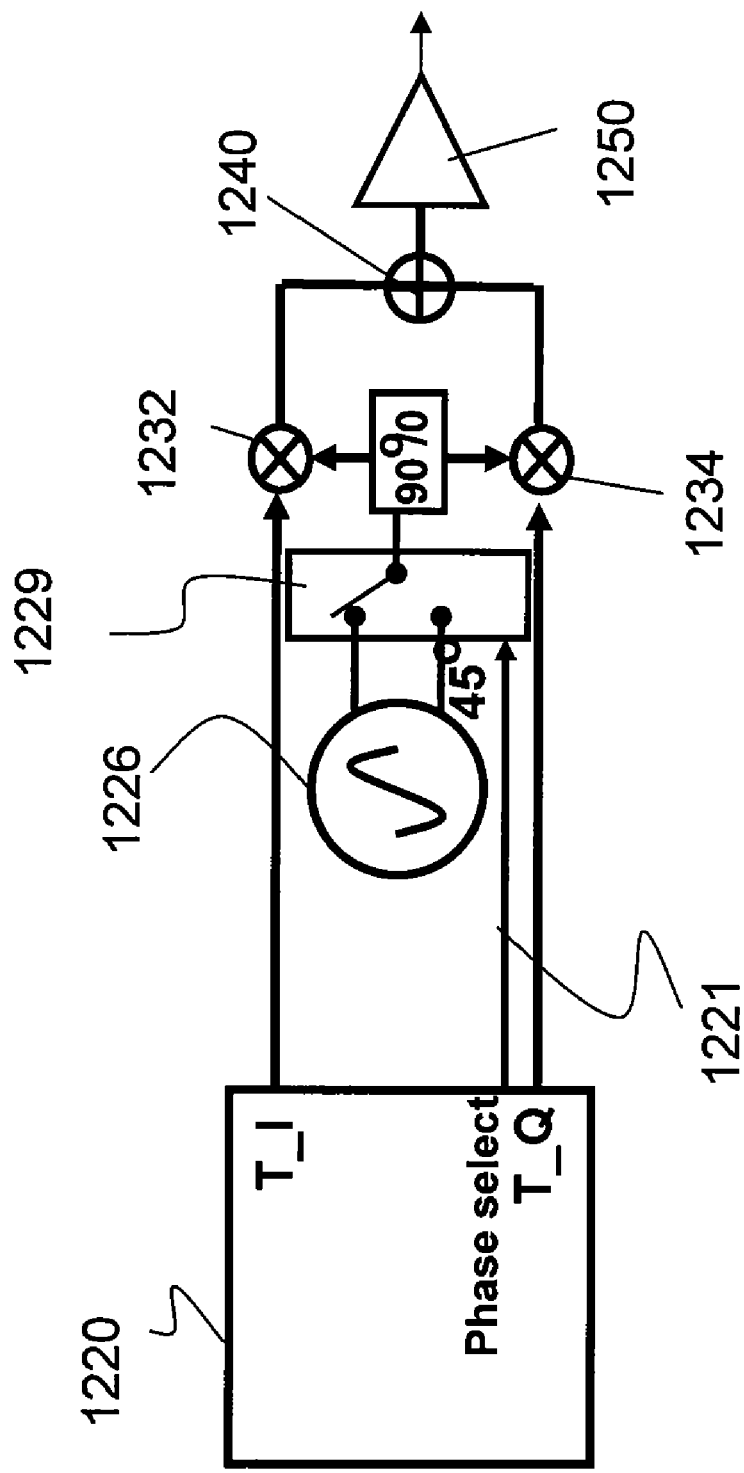
FIG. 12 schematically shows an alternative embodiment of the invention which uses an oscillator.
Figure 13:
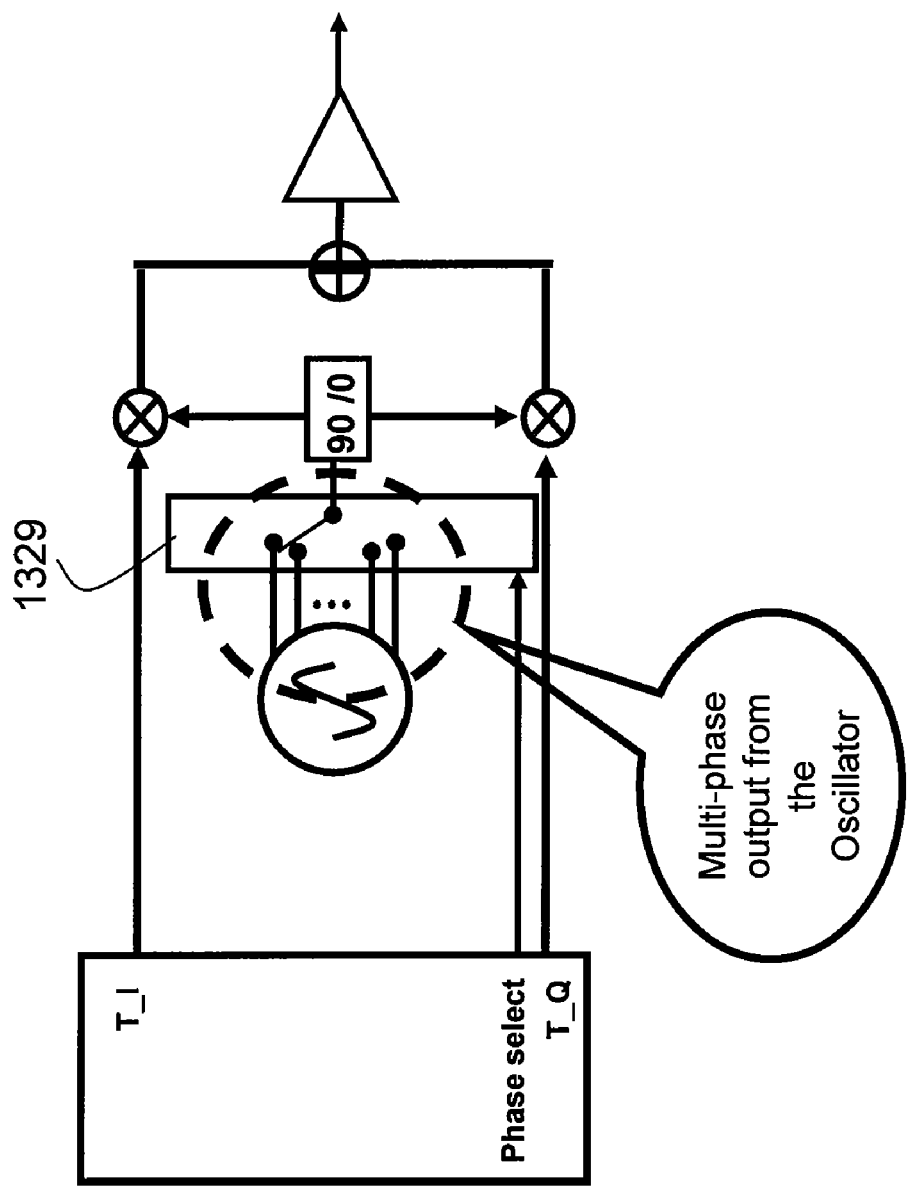
FIG. 13 shows an embodiment of the invention in which an oscillator communicates with a multiphase switch.

FIG. 12 schematically shows an alternative embodiment of the invention which uses an oscillator. In FIG. 12, oscillator 1226 and switch 1229 work together as a phase shifter. Transmitter 1220 provides phase select signal 1221 to switch 1229. Mixers 1232 and 1234 form two paired signals which are added by adder 1240. The signal defines an on-off constant envelop signal and it is amplified by amplifier 1250. FIG. 13 expand selector 1229 of FIG. 12 to have multiple phases. FIG. 13 shows that by using an oscillator one can generate multiphase output. Exemplary VCOs include rotary traveling wave oscillator ("RTWO") and multi-phase LC-VCO.

Figure 14:
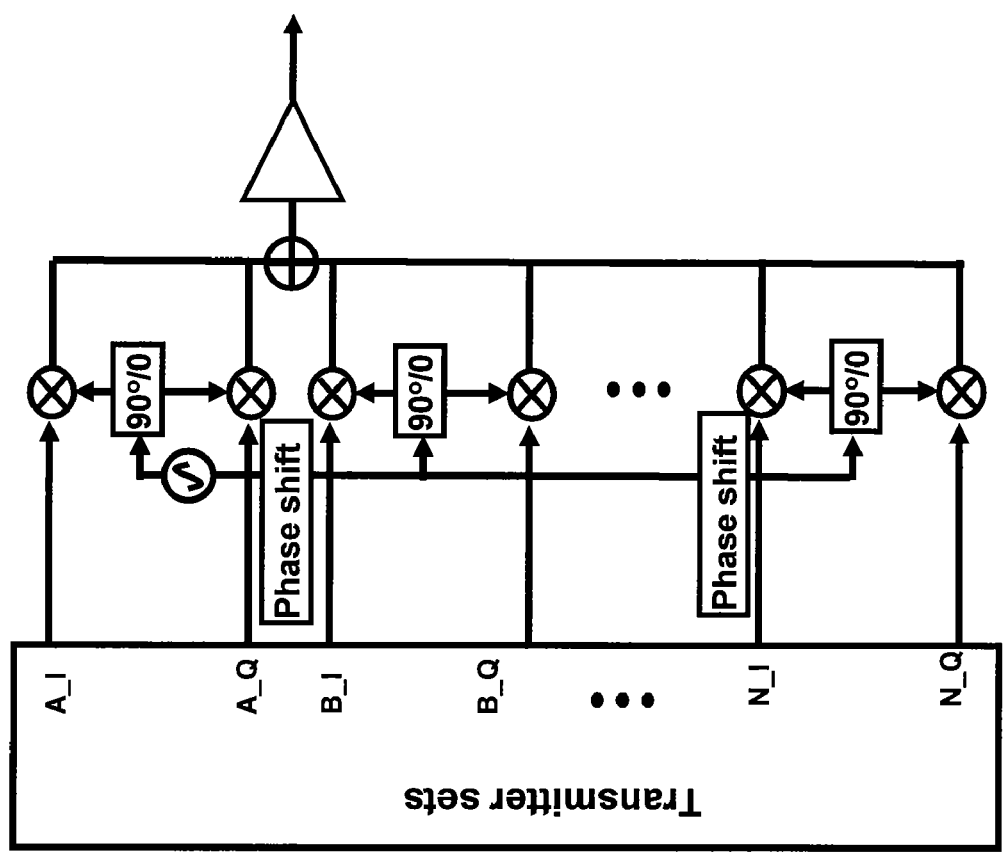
FIG. 14 shows an exemplary embodiment of the invention having multiple transmitter sets.

FIG. 14 shows an exemplary embodiment of the invention having multiple transmitter sets. It should be noted that while FIG. 14 contains only one power amplifier, the disclosed embodiment can be combined with multi-line Cartesian mapper for a multi-amplifier operation.

Figures 15A, 15B:
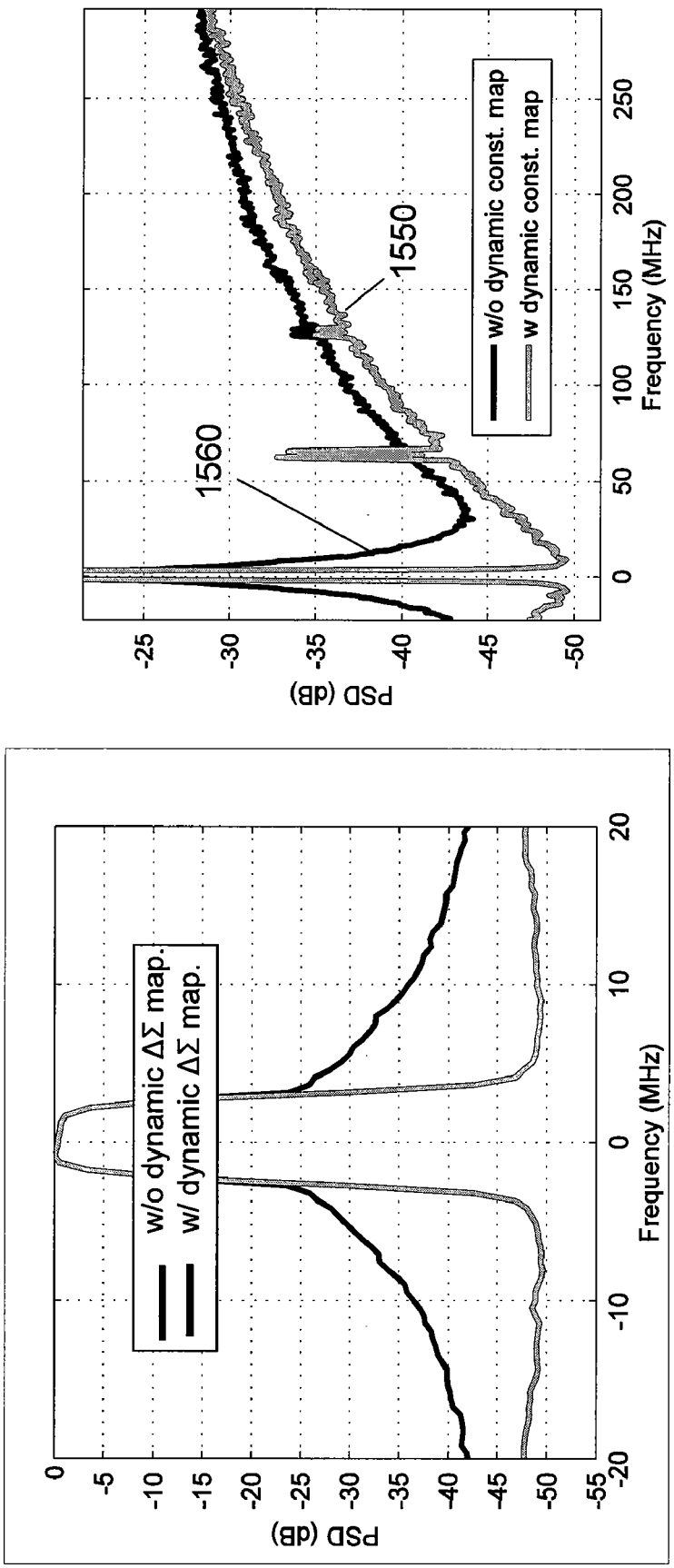
FIGS. 15A and 15B comparatively show the simulation results of an embodiment of the invention compared with a conventional mapping.

FIGS. 15A and 15B comparatively show the simulation results of an embodiment of the invention compared with a conventional mapping. Specifically, the figures show simulation example for I-line SPA with dynamic mapping to 2 ΔΣ mapping sets. Data set 1550 depict the PSD (dB) when dynamic ΔΣ mapping is implemented according to the disclosed embodiments. Data set 1560 shows PSD (dB) without dynamic mapping. The PSD is substantially higher to the left and the right of the carrier frequency when dynamic mapping is not used. The increased PSD in these regions indicates significant amplifier noise. On the other hand, when dynamic mapping is used, the PSD is substantially reduced at frequencies near the signal. FIG. 15B shows that dynamic mapping disclosed herein reduces quantization noise significantly over a larger frequency spectrum.

Figure 16A:
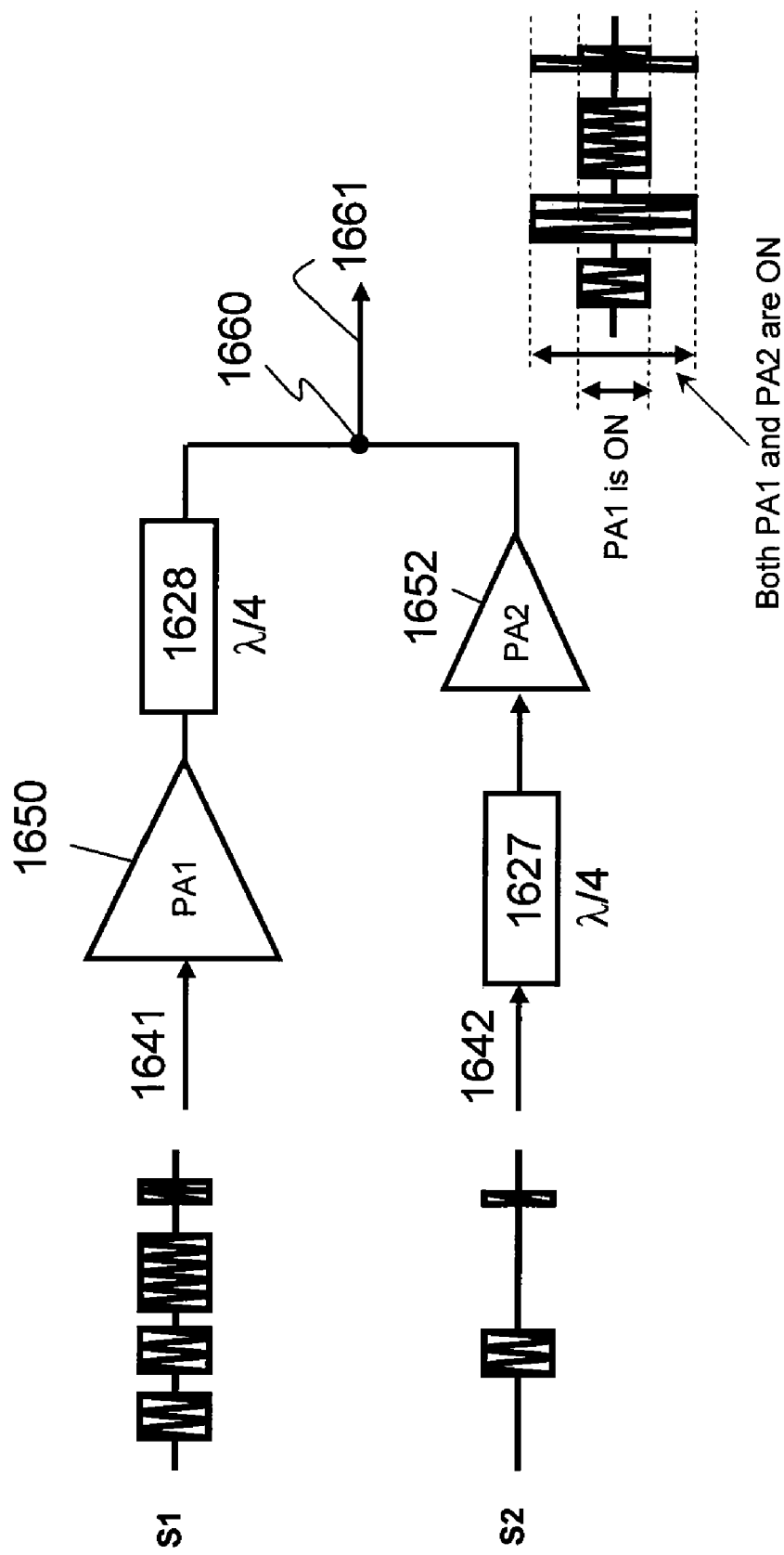
FIG. 16A shows a multi-stage combining scheme according to one embodiment of the invention.

Another embodiment of the invention relates to a method for effectively combing the various quantization levels. FIG. 16A is an exemplary power combining scheme according to one embodiment of the invention. In FIG. 16A, input signals 1641 (S1) and 1642 (S2) are directed to power amplifiers 1650 and 1652. Signals 1641 and 1642 can be on-off constant envelop signals as described above. Signal 1641 is amplified by amplifier 1650 before its phase is shifted by a fraction of its wavelength (λ/4) at phase shifter 1628. In contrast, a phase rotation is introduced to signal 1642 before it is amplified by amplifier 1652. Formation of combined signal 1661 is also pictorially illustrated in FIG. 16A. In one embodiment, signals 1641 and 1642 are on-off constant envelop signals which allow amplifiers 1650 and 1652 to operate in compressed mode.

Figures 16B, 16C:
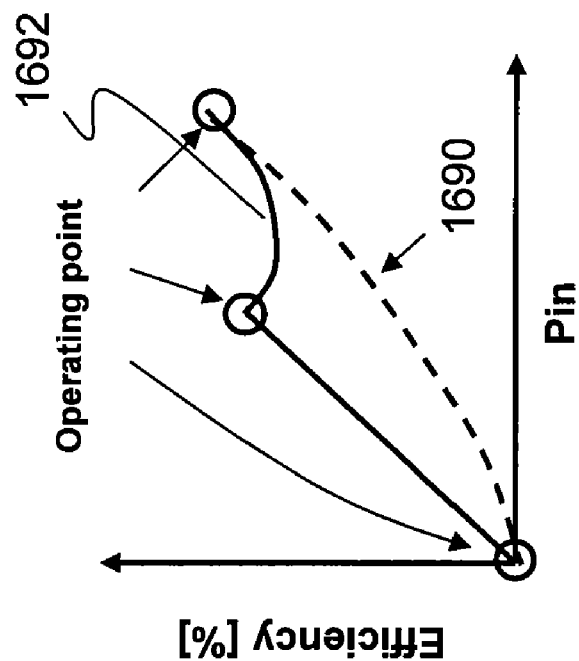
FIG. 16B is a signal mapping table for the amplifiers of FIG. 16A.
FIG. 16C compares the efficiency of the Doherty-like combiner of FIG. 16A with a conventional amplifier system.

FIG. 16B is a signal mapping table showing the amplifier gains for the amplifiers of FIG. 16A. In the exemplary embodiment of FIG. 16A, amplifier 1650 has the same the gain of amplifier 1652. Referring to FIGS. 16A and 16B, output signal 1661 is formed by multiplying each amplifier's gain to a corresponding signal and adding the 1660 the results.

FIG. 16C compares the efficiency of the Doherty-like combiner of FIG. 16A with a conventional amplifier system. Here, dashed line 1690 shows the relationship between input power (Pin) and efficiency for a conventional linear power amplifier. In contrast, solid line 1692 shows the same relationship for the Doherty amplifiers of FIG. 16A. The amplifiers are only turned on when the signal has a state of on or off. In the present invention, when the signal level is 0, the amplifier is turned off and does not consume power. In other words, amplifiers 1650 and 1652 are only on during the operating points as shown.

Figure 17A:
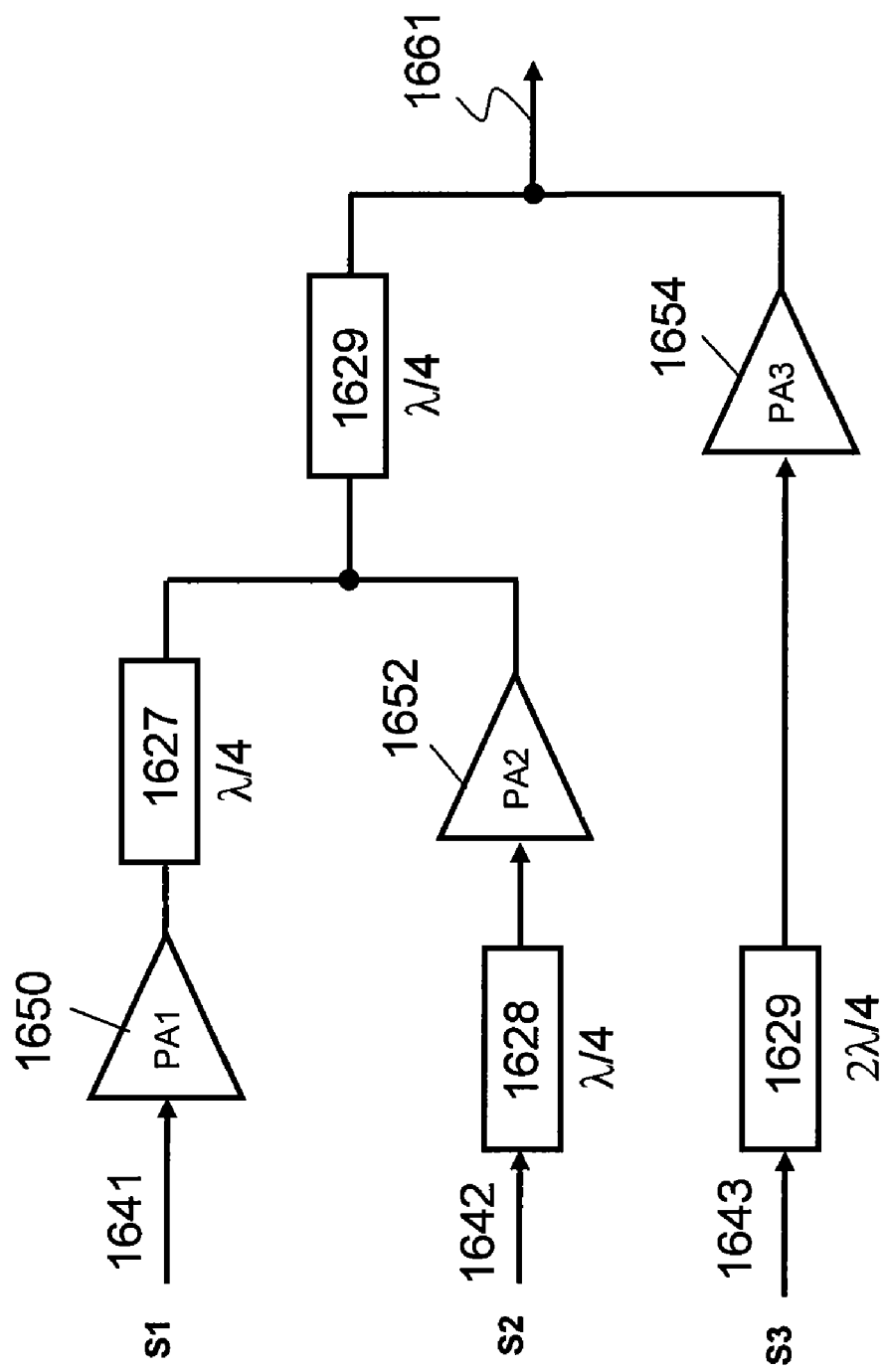
FIG. 17A shows a multi-stage combining scheme according to another embodiment of the invention.
Figures 17B, 17C:
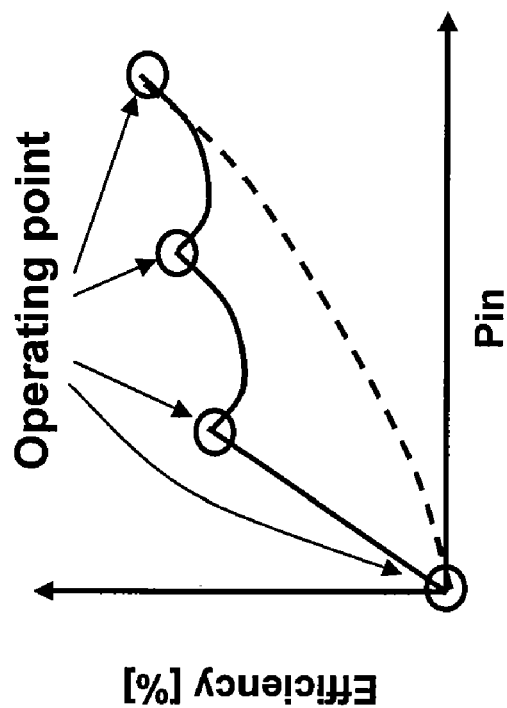
FIG. 17B is a signal mapping table for the amplifiers of FIG. 17A.
FIG. 17C compares the efficiency of the Doherty-like combiner of FIG. 17A with a conventional amplifier system.

FIG. 17A shows that the efficient combining scheme can be use in multi-stage combining. In FIG. 17A, incoming signals 1641 (S1), 1642 (S2) and 1643 (S3) are amplified and added through a Doherty-like combiner to boost efficiency at each quantization level. Amplifiers 1650, 1652 and 1654 provide identical gains. FIG. 17B shows a signal mapping table for signals 1641 (S1), 1642 (S2) and 1643 (S3). FIG. 17C compares the efficiency of the Doherty-like combiner of FIG. 17A with a conventional amplifier system. As in FIG. 16C, the operating points denote when the amplifiers are turned on. The operating points show the most efficient operating points for the system.

Figure 18A:
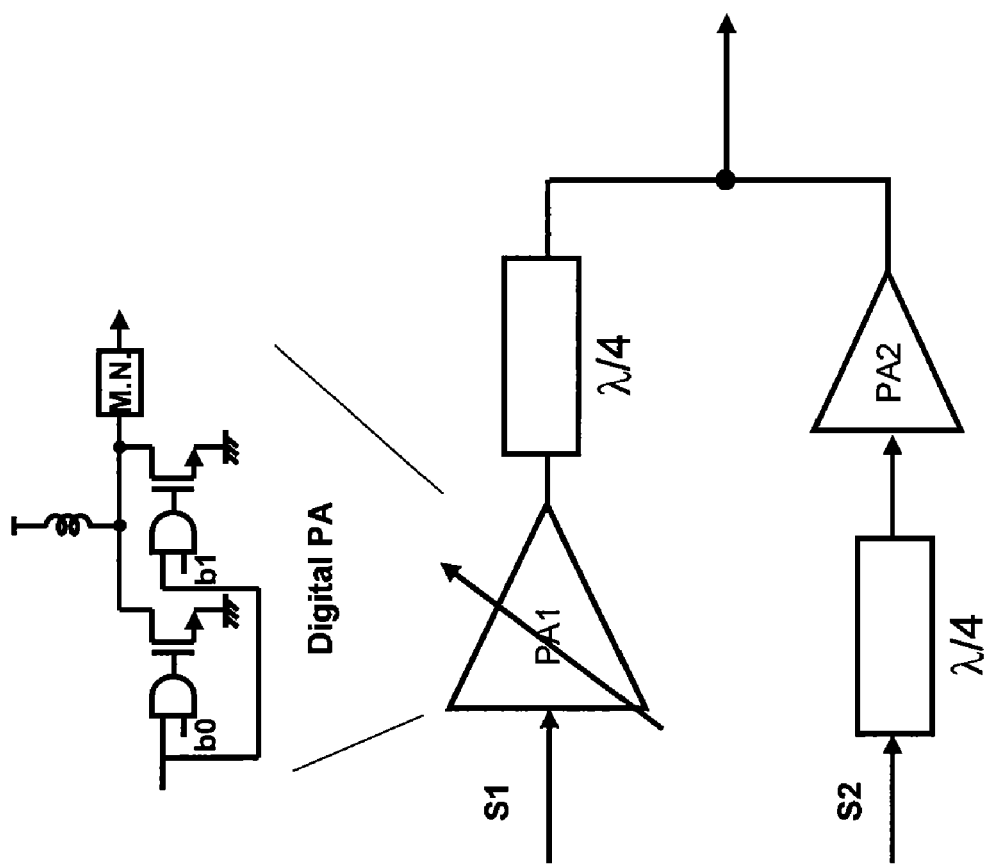
FIG. 18A shows another current summation technique using a variable-gain digital PA.
Figures 18B, 18C:
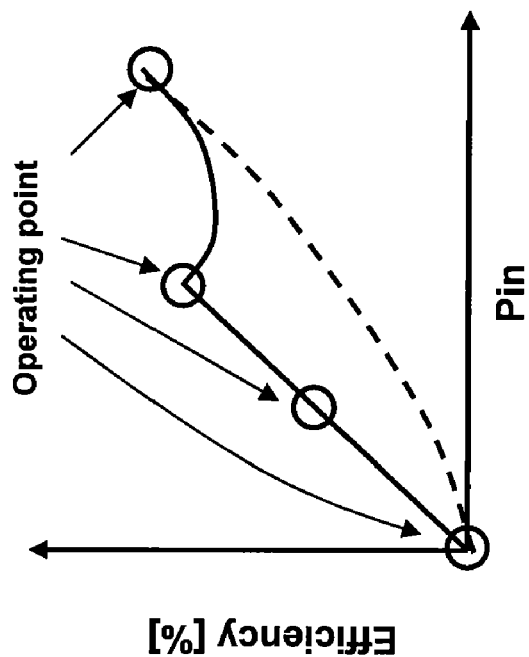
FIG. 18B shows a mapping table for the input signals of FIG. 18A.
FIG. 18C compares the efficiency of the Doherty-like combiner of FIG. 18A with a conventional amplifier system.

FIG. 18A shows another current summation technique using a variable-gain digital PA. The input signals are directed to power two amplifiers, one which has a variable gain. FIG. 18B shows a mapping table for the input signals of FIG. 18A and FIG. 18C shows the efficiency gained from implementing the architecture of FIG. 18A. FIG. 18A shows substantial efficiency gain when a non-constant envelop is mapped into signals having a constant envelop.

While the principles of the Invention have been illustrated in relation to the exemplary embodiments shown herein, the invention is not limited to the illustrative embodiments and may include modifications, variations, or permutations thereof.

What is claimed is:

1. A method for providing digital power amplification, the method comprising:
   receiving an I component signal and a Q component signal, the I component signal and the Q component signal defining multilevel digital signals;
   mapping the I component signal to a plurality of sub-I components and mapping the Q component signal to a plurality of sub-Q components, each of the sub-I component signals and the sub-Q component signals defining a tri-level signal;
   for each of the sub-I component signal, identifying a corresponding sub-Q component signal;
   orthogonalizing each sub-Q component signal relative to its corresponding sub-I component signal;
   combining each of the sub-I component signals with its corresponding sub-Q component signal to form a plurality of I and Q subcomponent pairs;
   amplifying each I and Q subcomponent pairs at a power amplifier operated in a compressed mode to form a plurality of amplified I and Q subcomponent pairs; and
   combining the amplified I and Q subcomponent pairs to form an output signal.

2. The method of claim 1, wherein the step of mapping the I/Q component signal to a plurality of sub-I/Q components further comprises using one of a binary-weighted coding or a thermometer coding to map a multilevel signal to a plurality of tri-level signals.

3. The method of claim 1, wherein the power amplifier is one of a binary-weighted or a thermometer-weighted amplifier.

4. The method of claim 1, wherein the power amplifier is turned off when not amplifying a signal.

5. The method of claim 1, wherein a first of the plurality of the I and Q subcomponent pairs is amplified at a first value and a second of the plurality of I and Q subcomponent pairs is amplified at a second value.

6. The method of claim 5, wherein the first I and Q subcomponent pairs and the second I and Q subcomponent pairs are amplified substantially simultaneously at differently weighted amplifiers.

7. The method of claim 1, further comprising generating the I component signal and the Q component signal from a digital baseband signal.

8. A method for reducing quantization noise during modulation of a digital baseband signal, the method comprising:
   receiving an I component signal and a Q component signal, determining signal levels for each of the refined I and Q component signals;
   defining a first quantization set and a second quantization set, the first quantization set having a plurality of first quantization points and the second quantization set having a plurality of second quantization points;
   dynamically mapping each of the signal levels to one of a first or the second quantization sets as a function of the signal level's proximity to one of the first or the second quantization points; and
   generating an output signal from the selected quantization set.

9. The method of claim 8, further comprising refining an I component signal and a Q component signal through a noise shaper circuit.

10. The method of claim 8, wherein the first quantization points are offset from the second quantization points by a first offset.

11. The method of claim 10, wherein the first offset is about 45°.

12. The method of claim 8, wherein each of the I component signal and the Q component signal defines a multilevel digital signal.

13. The method of claim 8, further comprising using an oscillator to provide a phase offset.

14. The method of claim 13, wherein the oscillator is an RTWO.

15. A method for amplifying a digital signal, the method comprising:
   receiving an I component signal and a Q component signal, determining signal levels for each of the refined I and Q component signals;
   defining a first quantization set and a second quantization set, the first quantization set having a plurality of first quantization points and the second quantization set having a plurality of second quantization points;
   dynamically mapping each of the signal levels to one of a first or the second quantization sets as a function of the signal level's proximity to one of the first or the second quantization points;
   generating an the I component signal and the Q component output signal from the selected quantization set;
   mapping the I component signal to a plurality of sub-I components and mapping the Q component signal to a plurality of sub-Q components, each of the sub-I component signals and the sub-Q component signals defining a tri-level signal;
   for each of the sub-I component signal, identifying a corresponding sub-Q component signal;
   orthogonalizing each sub-Q component signal relative to its corresponding sub-I component signal;
   combining each of the sub-I component signals with its corresponding sub-Q component signal to form a plurality of I and Q subcomponent pairs;
   amplifying each I and Q subcomponent pairs at a power amplifier operated in a compressed mode to form a plurality of amplified I and Q subcomponent pairs;
   combining the amplified I and Q subcomponent pairs to form an output signal.

16. A signal transmitter comprising:
   a receiver for receiving an I component signal and a Q component signal, the I component signal and the Q component signal defining multilevel digital signals;
   a mapper for mapping the I component signal to a plurality of sub-I components and mapping the Q component signal to a plurality of sub-Q components, each of the sub-I component signals and the sub-Q component signals defining a tri-level signal;
   a phase shifter for phase-shifting each sub-Q component signal relative to a corresponding sub-I component signal;
   a mixer for combining each of the sub-I component signals with its corresponding sub-Q component signal to form a plurality of I and Q subcomponent pairs;
   a plurality of amplifiers corresponding to each of the plurality of I and Q subcomponent pairs, each amplifier operating in a compressed mode to form a plurality of amplified I and Q subcomponent pairs; and
   an adder for adding the amplified I and Q subcomponent pairs to form an output signal.

17. The signal transmitter of claim 16, wherein each of the plurality of binary-weighted or thermometer-weighted amplifiers operates in a compressed mode.

18. The signal transmitter of claim 16, wherein the digital line mapper maps the first multilevel I/Q component signal to a plurality of sub-I/Q component signals using one of a binary-weighted coding or thermometer coding.

19. The signal transmitter of claim 16, wherein each of the plurality of amplifiers has a different amplifier gain.

20. The signal transmitter of claim 16, wherein each of the plurality of I and Q subcomponent pairs is a on-off constant envelop signal.

21. A system for reducing quantization noise, the system comprising a quantizer circuit programmed with instructions to:
 determine a plurality of signal levels for each of an I component signal and a Q component signal,
 identify a first quantization set and a second quantization set, the first quantization set having a plurality of first quantization points and the second quantization set having a plurality of second quantization points,
 assign each of the plurality of signal levels to one of the first quantization set or the second quantization set as a function of signal level's proximity to one of the first or the second quantization points, and
 generate an output signal from the selected quantization set.

22. The system of claim 21, wherein the system further comprises:
 a mapper for receiving the signal levels from the quantizer circuit, the mapper forming a plurality of first tri-level signals and a plurality of second tri-level signals, the first tri-level signals having a different phase from the second tri-level signals; and
 a combiner for combining the first tri-level signals and the second tri-level signals.

23. The system of claim 21, further comprising a noise shaper for receiving an I component signal and a Q component signal and refining each of the I and Q component signals.

24. A signal amplification system comprising:
 a quantizer circuit programmed with instructions to:
  determine a plurality of signal levels for each of an I component signal and a Q component signal,
  identify a first quantization set and a second quantization set, the first quantization set having a plurality of first quantization points and the second quantization set having a plurality of second quantization points,
  assign each of the plurality of signal levels to one of the first quantization set or the second quantization set as a function of signal level's proximity to one of the first or the second quantization points, and
  generate an output I component signal and a Q component signal from the selected quantization set;
 a mapper for mapping the I component signal to a plurality of sub-I components and mapping the Q component signal to a plurality of sub-Q components, each of the sub-I component signals and the sub-Q component signals defining a tri-level signal;
 a phase shifter for phase-shifting each sub-Q component signal relative to a corresponding sub-I component signal;
 a mixer for combining each of the sub-I component signals with its corresponding sub-Q component signal to form a plurality of I and Q subcomponent pairs;
 a plurality of amplifiers corresponding to each of the plurality of I and Q subcomponent pairs, each amplifier operating in a compressed mode to form a plurality of amplified I and Q subcomponent pairs; and
 an adder for adding the amplified I and Q subcomponent pairs to form an output signal.

* * * * *